United States Patent
Goldberg

(10) Patent No.: US 7,425,812 B2
(45) Date of Patent: Sep. 16, 2008

(54) RAMP RATE CLOSED-LOOP CONTROL (RRCC) FOR PC COOLING FANS

(75) Inventor: Randy B. Goldberg, Farmingdale, NY (US)

(73) Assignee: Standard Microsystems Corporation, Hauppauge, NY (US)

( * ) Notice: Subject to any disclaimer, the term of this patent is extended or adjusted under 35 U.S.C. 154(b) by 273 days.

(21) Appl. No.: 11/343,637

(22) Filed: Jan. 30, 2006

(65) Prior Publication Data

US 2007/0124574 A1 May 31, 2007

Related U.S. Application Data

(63) Continuation-in-part of application No. 11/286,529, filed on Nov. 23, 2005, now Pat. No. 7,138,781.

(51) Int. Cl.
*G05B 11/42* (2006.01)

(52) U.S. Cl. .................. 318/610; 318/609; 323/274; 323/273; 323/284; 365/185.19

(58) Field of Classification Search .......... 318/609, 318/610; 323/274, 273, 284
See application file for complete search history.

(56) References Cited

U.S. PATENT DOCUMENTS

| | | | |
|---|---|---|---|
| 4,702,413 A | 10/1987 | Beckey et al. | |
| 4,978,896 A * | 12/1990 | Shah | 318/254 |
| 5,447,414 A * | 9/1995 | Nordby et al. | 417/20 |
| 5,872,733 A | 2/1999 | Buti et al. | |
| 5,945,870 A | 8/1999 | Chu et al. | |
| 6,147,465 A * | 11/2000 | Hollenbeck | 318/254 |
| 6,313,441 B1 | 11/2001 | Schaper et al. | |
| 6,366,049 B1 * | 4/2002 | Chen et al. | 318/799 |
| 6,693,410 B1 | 2/2004 | Terrien | |
| 7,026,775 B2 * | 4/2006 | Kokubo et al. | 318/268 |
| 7,109,670 B1 * | 9/2006 | Rehm | 318/68 |
| 7,151,349 B1 * | 12/2006 | Williamson et al. | 318/254 |
| 2003/0175124 A1 * | 9/2003 | Hahn et al. | 417/44.1 |

* cited by examiner

*Primary Examiner*—Rita Leykin
(74) *Attorney, Agent, or Firm*—Meyertons Hood Kivlin Kowert & Goetzel, P.C.; Jeffrey C. Hood

(57) ABSTRACT

A fan controller may be integrated in silicon and may use an embedded microcontroller to implement a digital fan control algorithm. The microcontroller may continually monitor temperature and sample the speed of the controlled fan. The speed of the fan may be compared to RPM values fitted on a desired curve that is representative of the Temperature-versus-RPM function for the controlled fan. The fan control algorithm may be based on a ramp-rate closed-loop controller (RRCC), which may be operated to drive the fan to the desired speed at different rates, depending on the difference between the desired RPM and the actual RPM of the fan. The fan may also provide a Fan ID feedback signal to the microcontroller, which may use the Fan ID feedback signal upon system start-up to initialize the RRCC range settings and select the appropriate Temperature-versus-RPM function curve based on pre-determined values for the given fan.

31 Claims, 4 Drawing Sheets

RAMP RATE CLOSED-LOOP CONTROL (RRCC) FOR PC COOLING FANS

This application is a continuation-in-part of U.S. utility application Ser. No. 11/286,529, titled "Adaptive Controller For PC Cooling Fans," filed Nov. 23, 2005, now U.S. Pat. No. 7,138,781 whose inventors were David C. Murray, Dennis M. O'Brien, and Randy B. Goldberg, which is hereby incorporated by reference in its entirety as though fully and completely set forth herein.

BACKGROUND OF THE INVENTION

1. Field of the Invention

This invention relates to cooling equipment for electronic systems, e.g., fans, and more particularly, to controlling the rotational speed of a fan.

2. Description of the Related Art

Fans are often used to evacuate warm air from enclosures in which electronic systems are contained. For example, most computer systems include one or more cooling fans to aid in circulating the air inside the enclosures and for maintaining the temperature inside the enclosures within an acceptable range. The increased airflow provided by fans typically aids in eliminating waste heat that may otherwise build up and adversely affect system operation. Employing cooling fans is especially helpful in ensuring proper operation for certain central processing units (CPUs) with relatively high operating temperatures.

Control of fans in a system typically involves a fan control unit executing a fan control algorithm. A fan control algorithm may determine the method for controlling one or more fans that are configured to evacuate warm air from a system enclosure. For example, the fan control algorithm may specify that a fan's speed should be increased or decreased dependent upon a detected temperature. Such control algorithms may also involve turning off a fan if the temperature is deemed cool enough to do so, or in certain systems, such as personal computers (PCs) for example, lowering the speed of the fan and allowing the fan to continue running at a minimum speed.

For detecting the temperature, a temperature sensor may provide to the fan control unit a signal indicative of the current temperature of a particular temperature zone in the electronic system. Often, fans used for CPU and/or computer system cooling have a three-wire interface with wires for power, ground, and a tachometer signal. Fan drive systems often use a signal generator that provides a Pulse Width Modulated (PWM) signal to drive an external circuit that controls the voltage between the power and ground interfaces of the fan, which in turn controls the speed of the fan. Signal generators that provide PWM signals are useful because they provide a digital control for the pulse width of a signal. The fan is typically powered only for the duration of the pulse. Between pulses power to the fan is turned off, although the fan is typically still spinning during this time. The duty cycle of the PWM pulse train currently being provided to the fan determines the fan's speed. Another typical way to control three-wire fans is to drive the fan by utilizing a high side Field Effect Transistor (FET), thereby controlling the DC voltage supplied to the fan. Generally, this provides an effective dynamic control range of 3V, which typically ranges from 5V down to around 2V. The lower limit voltage (2V) is still sufficient to power the fan circuitry, and valid tachometer signals may still be obtained from the fan.

Alternatively, some computer systems use fan control circuitry that features a 4-wire fan interface, where the fourth wire typically carries an additional control signal from the system to the fan. Thus, for fan drive systems that use PWM signal generators, in addition to the power, ground, and tachometer signal, a four-wire fan will typically have a PWM-drive input, which is used to control the speed of the fan. In such systems, instead of switching the power to the entire fan on and off, generally only the power to the drive coils is switched, making the tachometer information available continuously. Another advantage of 4-wire fans is that the fan speed can typically be controlled at speeds as low as 10% of the fan's full speed.

Many PC desktop and workstation cooling fan solutions today use open loop 4-wire fan control methods, or are thermistor based, where a thermistor is integrated into the fan. Typically, when considering a computer system from an overall systems perspective, 4-wire PWM-controlled cooling fans have unnecessary (i.e. redundant) built-in circuitry, which typically adds complexity and cost to the fans. In addition, it is generally difficult to qualify different fans from multiple fan vendors when building a computer system due to the challenge in meeting the usually tight fan specifications.

Typically when an open-loop four-wire cooling fan control method is used, two fan curves are specified. The first is generally a desired Temperature-versus-PWM curve, and the second is usually a PWM-versus-RPM (Revolutions Per Minute—an indication of rotational fan speed) curve. Many currently available fan control devices implement the Temperature-versus-PWM curve, and the cooling fans must generally follow the tightly specified PWM-versus-RPM curve. Open loop four-wire fan control systems thus have to rely on the tight fan specifications supplied by the fan manufacturer in order to achieve the desired fan RPM for a given PWM command.

Simple proportional controllers have been introduced in certain fan control systems, though such controllers suffer from steady-state error, and the system response cannot be dampened to handle the wide variation of step-responses for fans from multiple fan vendors. In addition, it has become increasingly important for systems implementing fan control to be able to adjust the rotational speed of the fan without generating excessive acoustical noise.

Other corresponding issues related to the prior art will become apparent to one skilled in the art after comparing such prior art with the present invention as described herein.

SUMMARY OF THE INVENTION

In one set of embodiments, a ramp-rate closed-loop controller (RRCC) is configured to control the rotational speed of a fan using closed-loop control with minimal acoustical impact. One aspect of performing closed-loop fan control comprises setting a desired fan speed and generating a specified pulse width modulated (PWM) duty cycle to obtain that speed, without generating excessive acoustical noise. In various embodiments where fan control is performed by means other than PWM control, alternate control signals may be generated in a likewise manner. For example, a ramp control output may comprise a signal indicating whether the revolutions per minute (RPM), in other words the rotational speed, of the fan should be adjusted. The ramp control output may also include a second signal indicating the desired direction of the RPM adjustment. A ramp rate output may comprise a ramp rate signal enabling the setting of the rate at which the RPM of the controlled fan may be adjusted.

In systems relying on control methods other than PWM control, using an adaptive closed-loop velocity controller may help eliminate the need to implement a Temperatureversus-PWM function and a PWM-versus-RPM function, which may be replaced by a single Temperature-versus-RPM function. For further enhancement in controlling spin-up of the controlled fan, the closed-loop velocity controller may be implemented as an RRCC, where the RRCC may be configured to control the rotational speed of the fan by either ramping up or ramping down the RPM of the fan. The RRCC may further be configured to adaptively modify the ramp rate according to a difference between a desired target RPM value and the actual RPM value of the rotational speed of the controlled fan.

Performing fan control operations corresponding to the Temperature-versus-RPM function may be implemented using a microcontroller that may be configured in the fan controller. In one embodiment, a Fan ID feedback pin is provided, thereby making it possible to choose from a variety of several different fans on a given platform. The Fan ID feedback may also provide a mechanism to modify any of the respective parameters associated with the RRCC—thereby creating an adaptive controller.

In one set of embodiments, the fan controller may be integrated in silicon and may use an embedded microcontroller or state machine to implement a digital fan control algorithm. All hardware and/or split hardware/firmware implementations are also possible and are contemplated. For example, a microcontroller with firmware may implement certain portions of the algorithm, while remaining portions of the algorithm may be implemented in hardware. The microcontroller may continually monitor temperature. Fan speed may also be sampled and compared to RPM values fitted on a desired curve that is representative of the Temperature-versus-RPM function for a given fan. The RRCC configured in the fan closed-loop velocity controller may thus be operated to drive the fan to the desired speed.

In one embodiment, the fan also comprises a Fan ID voltage pin. A fan ID signal through the Fan ID voltage pin may be provided as a feedback signal to the microcontroller, which may use the Fan ID signal upon system start-up to initialize the closed-loop velocity controller settings. The Fan ID signal may be used to initialize the RRCC range settings and select the appropriate Temperature-versus-RPM function curve based on pre-determined values for the given fan issuing the Fan ID signal. In one set of embodiments, the fan control system may also facilitate Personal Computer (PC) manufacturers to have pre-engineered and embedded fan configurations in the BIOS of each platform. Thus, fans from different vendors may be changed at the factory without having to perform configuration programming. In one set of embodiments, the fan control algorithm may eliminate the need for a PWM command, thereby facilitating the removal of any associated circuitry from the fan and eliminating the need for commutation logic, thus reducing the cost of the fan. The fan control algorithm may also remain fully compatible with fan control systems that utilize a PWM command.

Other aspects of the present invention will become apparent with reference to the drawings and detailed description of the drawings that follow.

BRIEF DESCRIPTION OF THE DRAWINGS

The foregoing, as well as other objects, features, and advantages of this invention may be more completely understood by reference to the following detailed description when read together with the accompanying drawings in which.

Figure 1A:
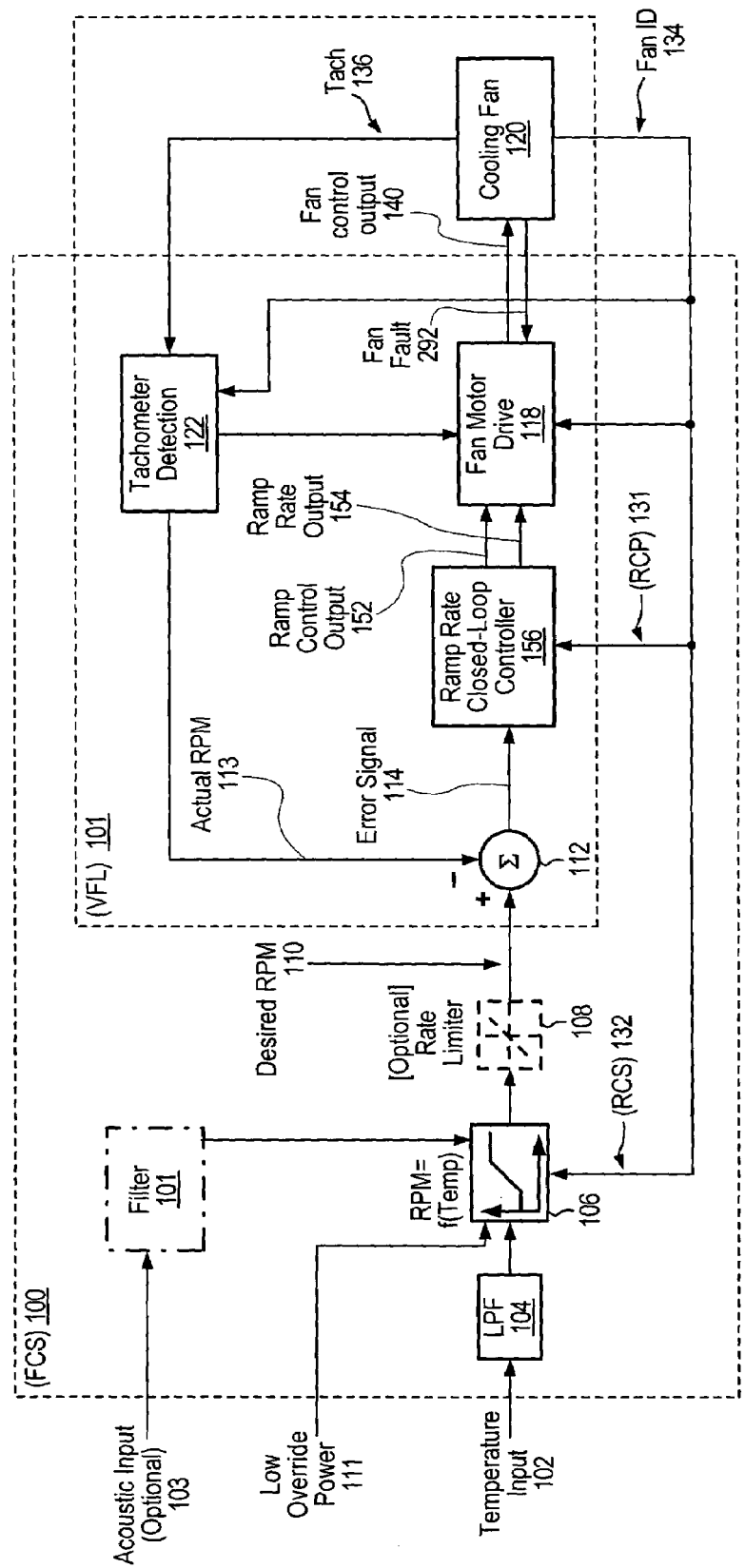
FIG. 1A shows a functional block diagram of one embodiment of closed loop fan control system with the loop closed on RPM, featuring a ramp-rate closed-loop controller.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not to be used to limit or interpret the description or claims. Furthermore, note that the word "may" is used throughout this application in a permissive sense (i.e., having the potential to, being able to), not a mandatory sense (i.e., must)." The term "include" and derivations thereof mean "including, but not limited to". The term "coupled" means "directly or indirectly connected".

DETAILED DESCRIPTION OF THE PREFERRED EMBODIMENTS

As used herein, a "controller" may mean a programmable microcontroller capable of executing code, or a hardware circuit configured to execute a specified function or set of functions and/or algorithms, or a combination of both. In some embodiments, a controller may mean a microcontroller adapted to execute a variety of specified algorithms, or a hardware circuit implementing a finite-state machine designed to perform the tasks required by the specified algorithms. The terms "range" and "interval" are both used to denote a continuous sequence of values, and are used interchangeably. Although, as used herein, a difference between two values A and B is interpreted to mean B subtracted from B (that is, A–B), it should be understood that when referring—for example—to "the difference between A and B", the position of A and B may be reversed, with a change in the sign of the result appropriately taken into consideration. For example, "if the difference between A and B is less than zero" may be considered the equivalent of "if the difference between B and A is greater than zero".

FIG. 1A shows a functional block diagram of one embodiment of a fan control system (FCS) 100. In this embodiment, actual temperature input 102 is sampled at the front end of FCS 100, and filtered with a low pass filter (LPF) 104 to smooth out noise and large temperature fluctuations. The filtered sampled temperature reading signal may then be provided as input to an RPM-versus-temperature profile function (RTPF) 106 that may generate and output a fan RPM value corresponding to the input temperature reading. In one sense, RTPF 106 may be configured to implement RPM as a function of temperature. RTPF 106 may be configurable by the user via RPM curve selection (RCS) input 132. An override signal 111 may also be used to override the output generated by RTPF 106. Override signal 111 may be operated to drive cooling fan 120 to a minimum RPM value when the system has been determined to be in a low power state. For example, in one set of embodiments, override signal 111 may be based on the power state (measured voltage and current) of a CPU configured in the system that is cooled by cooling fan 120. Various different RPM-versus-temperature profiles may be selected through RCS input 132 based on Fan ID input 134, which may be provided to FCS 100 by cooling fan 120. In alternate embodiments, for example when the type of cooling fan 120 is known, the RPM-versus-temperature profile may be selected through RCS input 132 without using fan ID 134. In general, RCS 132 may be used to select any of the RPM-versus-temperature profiles previously programmed into RTPF 106. The RPM output from RTPF 106 may be provided to an optional Rate Limiter 108 in order to reduce fluctuations of the speed of cooling fan 120. The output of Rate Limiter 108 may provide a desired RPM value 110, which may be used as the reference signal input by a velocity feedback loop (VFL) 101.

In one embodiment, VFL 101 operates to keep the speed of cooling fan 120 considerably close to desired RPM value 110, thereby providing stability for a wide variance of fan responses. As previously indicated, in some embodiments rate limiting may be performed by Rate Limiter 108 in the reference signal channel and not in the feedback loop comprised in VFL 101. In one set of embodiments VFL 101 may operate as follows. Desired RPM value 110 may be compared at summing node 112 to a sensed value of the actual speed (RPM) 113 of cooling fan 120 provided to summing node 112 by Tachometer Detection block (TD) 122. A resulting Error Signal 114 produced by summing node 112 may then be input into RRCC 156 in order to drive the actual speed of cooling fan 120 to the desired RPM value. The range settings for RRCC 156 may be set through RRCC parameter (RCP) settings 131, and may be based on Fan ID input 134. As previously noted, Fan ID input 134 may be provided to FCS 100 by cooling fan 120. The output of RRCC 156 may be provided to Fan Motor Drive block (FMD) 118, which may be configured to generate a set of one or more fan control signals 140 that is provided to cooling fan 120 to drive a motor, which may be a brushless DC fan motor comprised in cooling fan 120, towards the desired RPM value.

Fan ID input 134 may also be provided to FMD 118 to select between various types of fan drive configurations, each configuration selected according to the value of Fan ID input 134. Aspects of fan drive configuration may include the number of fan control/drive signals 140 to be provided to cooling fan 120 by FMD 118, and/or the drive buffer types to be used by FMD 118 in providing fan control/drive signals 140. Thus, these and other possible aspects of fan drive configuration may be performed corresponding to received Fan ID input 134. For example, Fan ID input 134 may identify fan 120 as comprising either a two-phase brushless DC motor or a three-phase brushless motor. A two-phase brushless DC motor may require one or two fan control/drive signals 140i while a three-phase motor may require two or three fan control/drive signals 140, with drive timing differing between the fan control/drive signals 140 provided to a two-phase motor and a three-phase motor, respectively. In certain embodiments when FCS 100 is configured for a known fan type, the chosen fan drive configuration may be selected without Fan ID input 134. In one set of embodiments, a fan fault signal 292 may be provided to FMD 118 in order to indicate to FCS 100 the occurrence of a fan hardware error. FCS 100 may be used to control a "dumb" cooling fan 120, where fan fault signal 292 may provide a reading of current flowing in the motor of cooling fan 120.

Another optional operating characteristic of FMD 118 may be to control the spin-up time of fan 120 upon startup. For example, smaller fans used in desktop PCs may have a much shorter spin-up time than larger blower fans used in workstations. Because spin-up time affects the noise generated by fan 120 upon startup, minimizing and/or optimizing the spin-up time in order to minimize and/or optimize the associated noise is desirable. Therefore, Fan ID input 134 may also be used to select the spin-up drive time of fan 120 in order to guarantee proper start up of fan 120. Since Fan ID input 134 is configured to uniquely identify a certain type and/or category of fan, a desirable and appropriate spin-up time for fan 120 may be selected based on Fan ID input 134. In addition, FCS 100 may be configured to perform pre-tachometer blanking, where FMD 118 is operated to turn off fan control output 140 in response to tachometer signal 136, according to the position of the rotor of cooling fan 120. It should be noted, however, that control of spin-up time of fan 120 may also be performed by RRCC 156, eliminating the need to configured spin-up time control in FMD 118.

In one set of embodiments, fixed Fan ID voltage output 134 provided by cooling fan 120 may serve as the Fan ID 134 input to FCS 100 and may be used to match the RPM-versus-temperature profile to a specific cooling fan 120 by configuring RTPF 106 through RCS 132. An optional acoustic input 103 may also be provided to RTPF 106 via filter 101. One example of acoustic input 103 may be a microphone input, which may enable automatic system level resonant mapping. Certain RPM values for the type of fan 120 identified by Fan ID input 134 may not be desirable and may be excluded, as those RPM values may correspond to certain mechanical resonant points of fan 120, leading to fan 120 generating considerably more noise when running at those RPM values. Based on audio input from acoustic input 103, system noise levels may be plotted with respect to RPM, and the resulting system noise-versus-RPM function may then be used to modify the RPM-versus-temperature profile to avoid any system resonant points in addition to the-aforementioned mechanical resonant points.

In one set of embodiments RTPF 106 may comprise an RPM look up table, where a jump may be inserted around the RPM values excluded based on the principles described above. Transitioning from one RPM value to a next RPM value by skipping directly over excluded RPM value(s) may itself result in highly audible noise, which may be equally undesirable. Thus, in certain embodiments RTPF 106 may further be configured to provide a smooth transition through the predetermined excluded RPM points based on Fan ID input 134 and audio input received from acoustic input 103, by enabling slowly transitioning from one valid RPM value to a next valid RPM value. In one aspect, RTPF 106 may be configured and operated to provide system level acoustic mapping and avoidance. It should again be noted, however, that RRCC 156 may also be operated to slowly ramping from one valid RPM value to a next valid RPM value (provided as desired RPM input 110) according to error signal 114, thereby reducing and/or eliminating highly audible noise.

In one embodiment, tachometer output 136 is the velocity feedback signal for VFL 101, and is provided by cooling fan 120 to TD 122. TD 122 may also receive Fan ID input 134 to allow for automatic selection of a correct number of tachometer pulses per revolution for fan 120 identified by Fan ID input 134. Selection of the correct number of tachometer pulses per revolution for fan 120 may be desirable due to dependence between the number of expected tachometer pulses per revolution and the number of poles in the motor comprised in fan 120. Again, if FCS 100 is configured for a known fan type, selection of the correct number of tachometer pulses per revolution for fan 120 may be performed during initial programming and without requiring Fan ID input 134.

Varying the size of fan 120 may result in vastly different step responses. RRCC 156 may be configured and operated to compensate in advance for potential differences in fan response that may arise from different types of cooling fan 120 responding in different ways. As previously described, since each different type of cooling fan 120 may be identified by a distinct Fan ID, each different type of cooling fan 120 may provide a distinct Fan ID voltage signal 134 to FCS 100. In one embodiment, upon start-up of a system that comprises FCS 100, Fan ID voltage 134 is sampled by FCS 100, then RTPF 106 and RRCC 156 are programmed through RCS 132 and RCP 131, respectively, to pre-determined values corresponding to the type of the currently coupled and monitored cooling fan 120. The pre-determined values may be selected in accordance with obtaining a particular response (which may be deemed acceptable) from the currently coupled and monitored cooling fan 120. This may facilitate the use of a wide range and types of cooling fan 120 with FCS 100. Thus, any cooling fan 120 thus qualified may be changed when a system that comprises FCS 100 is assembled, for example at a factory, or any qualified cooling fan 120 may be replaced by an end user of the system, without requiring configuration programming by the user.

In one set of embodiments, configuring RRCC 156 in FCS 100 and VFL 100 facilitates eliminating the Temperature-versus-PWM and PWM-versus-RPM functions, and implementing a single RTPF 106. This in turn may facilitate the removal of redundant circuitry that may be configured in cooling fan 120 to implement the PWM-versus-RPM functionality. In other words, additional fan circuitry may be configured and incorporated into FCS 100, thereby enabling the use of a "dumb fan", so labeled because control components previously configured inside cooling fan 120 may be removed from cooling fan 120 and added into FCS 100. One aspect of VFL 101 is that it provides a closed loop for controlling the velocity of cooling fan 120, thereby supplanting open loop fan control algorithms. Furthermore, when configured with RRCC 156, VFL 101 may be tuned for minimal acoustical impact for a wider variety of fans.

RRCC 156 may be configured to use ramp rate control—limiting the rate of change of fan control output 140—to achieve a desired RPM when controlling the speed of cooling fan 120, and measuring the speed of cooling fan 120 via tachometer 122. In the embodiment shown in FIG. 1A, RRCC is configured to generate two outputs, ramp control output 152 and ramp rate output 154, and to accept RRCC parameter settings 131. RCP settings 131 will be further described below. Ramp control output 152 may be used to control FMD 118 to increase or decrease the RPM of cooling fan 120, while ramp rate output 154 may be used to control the rate at which the RPM of cooling fan 120 is either decreased or increased by FMD 118. In other words, depending on the difference between desired RPM 110 and actual RPM 113, the RPM of fan 120 may be ramped either up or down at potentially different rates to get closer to desired RPM 110. In some embodiments, ramp control output 152 may comprise two separate signals, one for indicating if ramping of the RPM should occur at all, and the other to indicate whether the RPM should be increased or decreased.

For a greater difference between actual RPM 113 and desired RPM 110, the RPM of fan 120 may be ramped up or down at a faster rate than when the difference between actual RPM 113 and desired RPM 110 is considerably smaller. Consequently, as actual RPM 113 approaches desired RPM 110, the RPM of fan 120 may be ramped at a slower rate to try to match desired RPM 110. Once actual RPM 113 is within a small window close to desired RPM 110, the RPM of fan 120 may remain at the present value, thereby maintaining the speed of fan 120 at desired RPM 110. Any changes in the speed of fan 120 due to external forces such as voltage dips or air flow from other fans, for example, may be corrected by RRCC 156 by controlling fan motor drive to change the RPM of fan 120 accordingly.

As described above, ramp rate control involves controlling fan motor drive 118 such that a change in the RPM of fan 120 is not abrupt, but may instead be slowly ramped to a desired value. In one set of embodiments, the rate at which fan motor drive 118 ramps the value of the RPM of fan 120—in response to RRCC 156—may be variable. One benefit of ramp rate control is that abrupt changes in desired RPM value 110 may not result in objectionable audible responses from cooling fan 120. Therefore, using RRCC 156 is highly desirable for mitigating objectionable fan noise that may occur when changing the RPM of fan 120. In one set of embodiments, RRCC 156 may help achieve an actual RPM value 113 that is very close to desired RPM value 110 for closed loop fan control under steady state, with very few corrections having to be made to the RPM of fan 120 once in steady state. Since, in some cases, the output of tachometer 122 may exhibit jitter, and the outputs of tachometer 122 may comprise discrete values due to the desired RPM 110 values also being discrete (typically within a 1% resolution), it may be possible to remain close to desired RPM value 110 without steady state variations fan control output 140.

In one set of embodiments, RRCC 156 operates by treating desired RPM 110 as a set point, and defining several ranges around the set point. A 'gold' range may be defined as the range for which error signal 114 is small, for example within thirty revolutions per minute of desired RPM value 110. A 'silver' range may be defined as the range for which error signal 114 is large enough to not to fall within the gold range, but is still small enough to remain relatively close to the set point, for example within two hundred revolutions per minute within desired RPM value 110. A 'bronze' range may be defined as the range for which error signal 114 is large, for example more than two hundred revolutions per minute off from desired RPM value 110. For each range, gold, silver or bronze, error signal 114 may either be negative or positive. Each range setting may be programmed into RRCC 156 as part of RCP settings 131. As an example, if desired RPM 110 is set to 3000 RPM, the 'gold' range may be set to 3000 RPM±30 RPM, the 'silver' range may be set to 3000 RPM±300 RPM (except 2970 RPM to 3030 RPM, which is part of the 'gold' range), and anything above 3300 RPM or below 2700 RPM may be be part of the 'bronze' range. For this example, if the actual RPM value 113 of fan 120 is, say, 3320 RPM, RRCC 156 may operate to control fan motor drive 118 to decrease the RPM of fan 120 at a high rate. If the actual RPM value 113 of fan 120 is 2900 RPM, RRCC 156 may operate to control fan motor drive 118 to increase the RPM of fan 120 at a considerably slower rate than it operated to decrease the RPM of fan 120 from 3320 RPM. This may allow the output of tachometer 122 to more slowly approach desired RPM value 110, which is set at 3000 RPM. Finally, if actual RPM value 113 is 3020 RPM, ramp rate signal 154 may be turned off or set to zero, resulting in fan motor drive 118 not modifying the RPM of fan 120, so the RPM of fan 120 thereby remaining very close to desired RPM value 113 set at 3000 RPM.

The different ramp rates occurring in the 'silver' and 'bronze' ranges may be varied—the ramp rate in the bronze range remaining higher than the ramp rate in the silver range—resulting in different loop characteristics. The fan noise delta may be kept to a minimum by configuring RRCC 156 to provide a very slow ramp rate in the 'silver' range, and to not alter the fan RPM when in the 'gold' range. Conversely, configuring RRCC 156 to provide a fast ramp rate in the 'bronze' range may result in much faster closure for VFL 101. The values for the ramp rates and range sizes may be chosen such that there isn't excessive overshoot when approaching the set point (desired RPM value 113), as that may result in unwanted oscillation. An example of a fast ramp rate may be 100 ms, and a slow ramp rate may be 500 ms, with a 'gold' range of ±30 RPM, and a 'silver' range of ±170 RPM, as per the example provided above.

Considering an ideal fan model—RPM monotonic with respect to a PWM input with no tachometer jitter—oscillation of a controlled fan may be preempted by an RRCC closed loop with properly chosen loop parameters. In practice, however, if a tachometer reading indicated that the RRCC loop was operating at a borderline value between the 'gold' range and the 'silver' range, some small oscillations may be present. This oscillation may be transitory, as the adjustments may force the tachometer reading towards the center of the gold band. In one set of embodiments, the oscillations may be minimized or eliminated by applying hysteresis to the value of the 'gold' range. The width of the 'gold' range may be configured to be dynamic, such that the width of the 'gold' range is slightly greater when the RRCC loop is operating in the 'gold' range than when the RRCC loop is operating in the 'silver' range. By specifying a 'gold' range delta width value (as an option), the width of the original, or default, 'gold' range value may be increased for when the RRCC loop is operating in the 'gold' range, while remaining at the default value when the RRCC loop is operating in the 'silver' range. Employing a delta width value for hysteresis allows to configure the RRCC loop such that a transition from the 'gold' range to the 'silver' range requires a greater change in fan speed than the change required to transition from the 'silver' range to the 'gold' range. This may eliminate the tendency of the fan to oscillate when a tachometer reading indicates a value that is on the borderline of the 'silver' range and the 'gold' range.

In one set of embodiments, RRCC 156 may be implemented in hardware, while in other embodiments it may be implemented in software and/or firmware executed by a microcontroller or a similar processing device or devices. In addition as shown in FIG. 1A, RRCC 156 may work equally well with existing 4-wire legacy fans, or new "dumb fans", as previously described. One distinct advantage of the embodiment shown in FIG. 1A is a potentially low acoustic spin-up of fan 120, where spin-up may be considered the act of overcoming the initial inertia of a stopped fan. The embodiment shown in FIG. 1A allows for a spin-up of fan 120 with a minimum of electrical and acoustical noise.

Figure 1B:
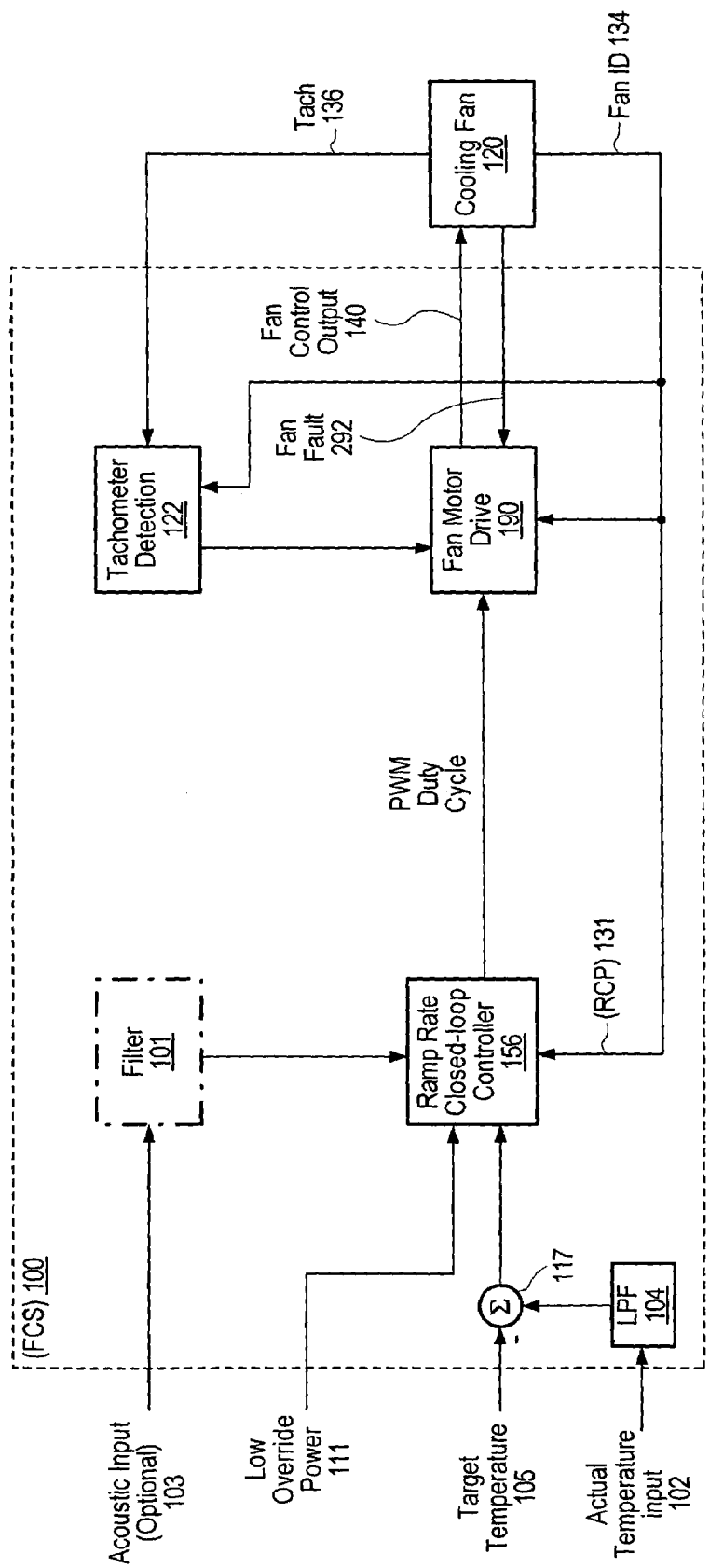
FIG. 1B shows a functional block diagram of a second embodiment of a closed loop fan control system with the loop closed on temperature, featuring a ramp-rate closed-loop controller.

FIG. 1B shows an alternate embodiment of FCS 100 in which the loop is closed on temperature instead of RPM. As shown, RRCC 156 may be configured to generate a control signal, in this case the duty cycle value of a pulse-width modulated (PWM) signal, according to a selected target temperature 105. Each different target temperature 105 provided to RRCC 156 may correspond to (and represent) a respective desired RPM value. The PWM duty cycle value may be provided to fan motor drive 190, which may be configured to generate a corresponding PWM signal to power fan 120. In this embodiment VFL 101 is replaced by a closed loop on temperature, where target temperature 105 (corresponding to a desired RPM value) is compared with actual temperature input 102. As in the embodiment shown in FIG. 1A, actual temperature input 102 may be sampled at the front end of FCS 100, and filtered with LPF 104 to smooth out noise and large temperature fluctuations. The filtered sampled actual temperature reading maybe compared with target temperature 105 at summing node 117, and the resulting error signal output from summing node 117 may be used to adjust the PWM duty cycle output generated by RRCC 156. While not configured with VFL 101, the embodiment shown in FIG. 1B nevertheless features accurate control of fan 120 through RRCC 156. In this case RRCC 156 may be indirectly controlling the RPM of fan 120 by adjusting the PWM duty cycle value. RRCC 156 may be operated as further described below.

Figure 2A:
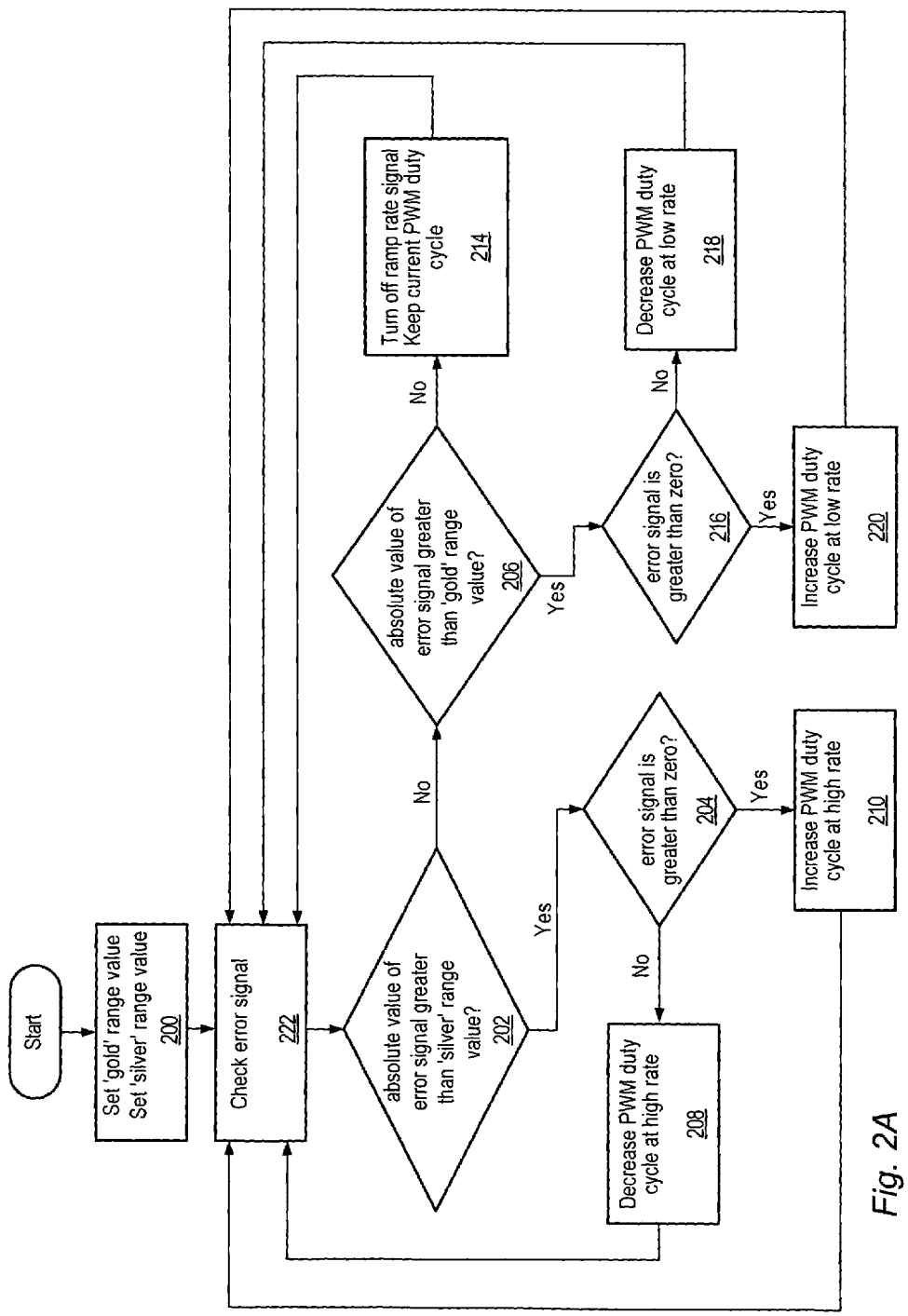
FIG. 2A shows a flow chart of one possible embodiment of the operation of a ramp-rate closed-loop controller.

FIG. 2A shows a flow chart of one possible embodiment of the operation of RRCC 156. For this embodiment, RRCC is configured to change the PWM duty cycle value for powering a fan (such as fan 120). In other embodiments, the action taken may be different from setting a PWM duty cycle value, depending on the chosen method or methods for powering the fan. For example, instead of the PWM duty cycle value, a ramp control output signal value (such as ramp control output 152) may be changed in a manner similar as that shown in FIG. 2A. After setting the values for the 'gold' range and the 'silver' range (200), the error signal, may be checked (222), where the error signal may represent a difference signal of the actual RPM value (for example actual RPM value 113) subtracted from the set point RPM value (for example desired RPM value 110). If the absolute value of the error signal is greater than the 'silver' range value (202), RRCC 156 may be operated to change the PWM duty cycle value at a ramp rate according to the 'bronze' range, and the direction of potential RPM change may be determined by checking whether the error signal is greater than zero (204). An error signal greater than zero (204) would indicate that the fan is running way too slow, and the PWM duty cycle value may be increased at a high rate (210). An error signal less than zero (204) would indicate that the fan is running way too fast, and the PWM duty cycle value may be decreased at a high rate (208).

If the absolute value of the error signal is less than the 'silver' range value (202), but is greater than the 'gold' range value (206), RRCC 156 may be operated to change RPM values at a ramp rate according to the 'silver' range, and the direction of potential RPM change may be determined by checking whether the error signal is greater than zero (216). An error signal greater than zero (216) would indicate that the fan is running a little too slow, and the RPM of the fan may be increased at a low rate (220). An error signal less than zero (216) would indicate that the fan is running a little too fast, and the RPM of the fan may be decreased at a slow rate (218). If the absolute value of the error signal is less than the 'gold' range value (206), the ramp rate control signal may be turned off and the RPM of the fan may be kept at its current value (214). Referring to the embodiments in FIGS. 1A and 1B, the tuning parameters for VFL 101 comprising RRCC 156 may be adjusted based on Fan ID voltage 134 received from fan 120, which may be a "dumb fan" as previously described. This may allow VFL 101 to be tailored to a specific type of "dumb" fan, which would indicate to the fan controller its characteristics via Fan ID analog input 134. Ramp-rate closed-loop control therefore combines the acoustical benefits of ramp-rate control with the ability to close the loop around a target RPM.

Figure 2B:
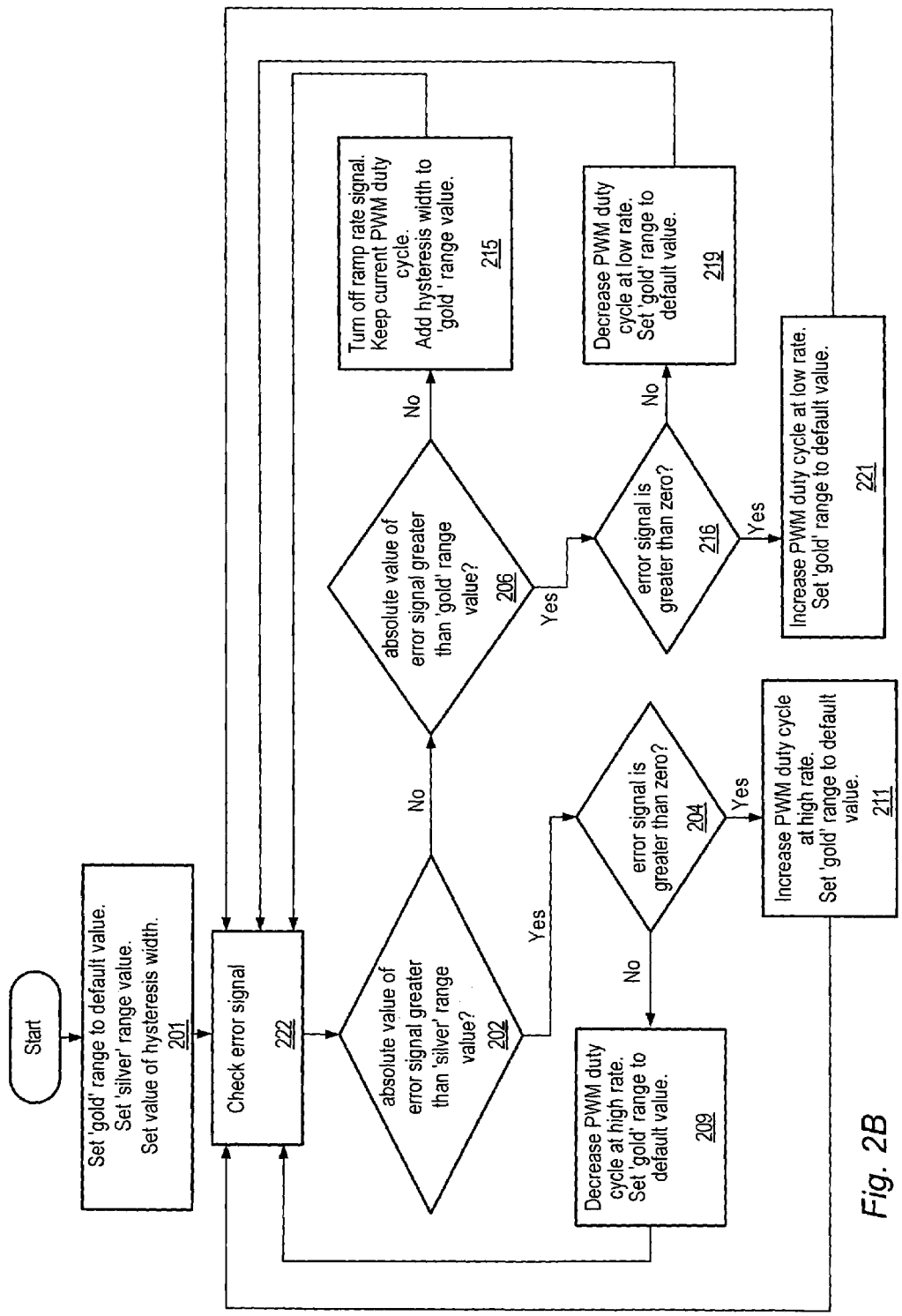
FIG. 2B shows a flow chart of an alternate embodiment of the operation of a ramp-rate closed-loop controller, using hysteresis.

FIG. 2B shows a flow chart of an alternate embodiment of the operation of RRCC 156 that uses a hysteresis value for slightly modified operation while within the 'gold' range. For this embodiment, RRCC is again configured to change the PWM duty cycle value for powering a fan (such as fan 120). In other embodiments, the action taken may be different from setting a PWM duty cycle value, depending on the chosen method or methods for powering the fan, as also discussed for FIG. 2A. In the embodiment of FIG. 2A, a default value may be set for the 'gold' range, along with setting the value for the 'silver' range and for a chosen hysteresis width (201). The error signal (similar to the error signal described in reference to FIG. 2A) may be checked (222), and if the absolute value of the error signal is greater than the 'silver' range value (202), RRCC 156 may be operated to change the PWM duty cycle value at a ramp rate according to the 'bronze' range, and the direction of potential RPM change may be determined by checking whether the error signal is greater than zero (204). An error signal greater than zero (204) would indicate that the fan is running way too slow, and the PWM duty cycle value may be increased at a high rate (211). An error signal less than zero (204) would indicate that the fan is running way too fast, and the PWM duty cycle value may be decreased at a high rate (209).

If the absolute value of the error signal is less than the 'silver' range value (202), but is greater than the 'gold' range value (206), RRCC 156 may be operated to change RPM values at a ramp rate according to the 'silver' range, and the direction of potential RPM change may be determined by checking whether the error signal is greater than zero (216). An error signal greater than zero (216) would indicate that the fan is running a little too slow, and the RPM of the fan may be increased at a low rate (221). An error signal less than zero (216) would indicate that the fan is running a little too fast, and the RPM of the fan may be decreased at a slow rate (219). If the absolute value of the error signal is less than the 'gold' range value (206), the ramp rate control signal may be turned off, the RPM of the fan may be kept at its current value, and the hysteresis width may be added to the current 'gold' range value (214).

At stages 211, 209, 221, and 219, the 'gold' range value may also be reset to the default value, as the RRCC loop is indicated to be operating in either the 'bronze' range or the 'silver' range, respectively. It should be noted that stages 211, 209, 221, and 219 provide one possible time when the value of the 'gold' range may be set to the default value while operating in the 'bronze' range or the 'silver' range, respectively. In alternate embodiments, the 'gold' range may be set to the default value before stage 204, for example, if stage 202 indicates that the RRCC loop is currently operating in the 'bronze' range, or before stage 216 if stage 206 indicates that the system is currently operating in the 'silver' range. Those skilled in the art will also appreciate that once the current operating range has been determined, the value of the 'gold' range may be set to the default value accordingly. In other embodiments, stage 222 may be configured to also check the current value of the 'gold' range, where the value of the 'gold' range is subsequently changed only if such a change is required (i.e. if the value of the 'gold' range includes the hysteresis width, while the RRCC loop is now operating in either the 'silver' or 'bronze' range.)

Those skilled in the art will also appreciate that the error signal referenced in FIGS. 2A and 2B may be generated according to a closed loop based on one of a variety of different types of inputs, which may include RPM, temperature, acoustic noise, and so forth. While FIG. 1A shows ramp control output 152 and ramp rate output 154 being generated based on a loop closed on RPM, in alternate embodiments, ramp control output 152 and ramp rate output 154 may be generated based on a loop closed on temperature (such as the one shown in FIG. 1B). Similarly, a PWM duty cycle value (as shown in FIG. 1B) may be generated based on a loop closed on RPM, (such as the one shown in FIG. 1A). It should also be noted that while various embodiments have been described relating to controlling the rotational speed of a fan, ramp-rate closed-loop feedback control of other systems and/or system elements according to principles of the present invention is also possible and is contemplated. Any control parameter, for example speed control in general, may be achieved by applying the principles described herein, and the controlled system need not comprise a fan or fans, but may instead comprise other controllable devices.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

I claim:

1. A method for controlling the rotational speed (RPM) of at least one fan, the method comprising:
    specifying a plurality of RPM range values;
    specifying a plurality of ramp rates, wherein each one of the plurality of ramp rates corresponds to a different respective one of the plurality of RPM range values;
    determining a difference between a present RPM of the at least one fan and a desired RPM of the at least one fan, by comparing the desired RPM and the present RPM;
    selecting a present ramp rate from the plurality of ramp rates, wherein the present ramp rate corresponds to a largest one of the plurality of RPM range values that is less than the size of the difference between the desired RPM and the present RPM;
    adjusting the present RPM according to the difference between the desired RPM and the present RPM and at the present ramp rate, to reach the desired RPM; and
    adjusting a present value of at least one of the plurality of RPM range values in response to said determining.

2. The method of claim 1, further comprising generating an error signal representative of the difference between the desired RPM and the present RPM;
    wherein said adjusting the present RPM comprises adjusting the present RPM according to the error signal.

3. The method of claim 2, wherein said adjusting the present RPM according to the error signal comprises:
    increasing the present RPM if the error signal is greater than zero; and
    decreasing the present RPM if the error signal is less than zero.

4. The method of claim 1, wherein said adjusting the present RPM comprises maintaining the present RPM when the difference between the desired RPM and the present RPM is less than or equal to a present value of a smallest one of the plurality of RPM range values.

5. The method of claim 1, wherein said adjusting the present value of the at least one of the plurality of RPM range values comprises increasing the present value of the at least one of the plurality of RPM range values by a specified amount.

6. The method of claim 1, wherein each successive one of the plurality of RPM range values is larger than a preceding one of the plurality of RPM range values, and each successive one of the plurality of ramp rates is larger than a preceding one of the plurality of ramp rates, wherein a smallest one of the plurality of ramp rates corresponds to the smallest one of the plurality of RPM range values.

7. The method of claim 1, wherein said specifying the plurality of RPM range values and said specifying the plurality of ramp rates are performed according to a fan identification output received from the at least one fan.

8. The method of claim 1, further comprising:
receiving an actual temperature input from at least one temperature sensor; and
generating the desired RPM based on the actual temperature input.

9. The method of claim 1, further comprising:
generating a ramp control output based on the difference between the desired RPM and the present RPM; and
providing the ramp control output to a fan motor drive;
wherein said adjusting the present RPM comprises the fan motor drive controlling the at least one fan according to the ramp control output.

10. The method of claim 9, further comprising:
generating a ramp rate output according to the present ramp rate; and
providing the ramp rate output to the fan motor drive;
wherein said controlling the at least one fan comprises the fan motor drive changing the present RPM at a rate according to the ramp rate output.

11. The method of claim 1, further comprising:
generating a pulse width modulated (PWM) duty cycle output based on the difference between the desired RPM and the present RPM; and
providing the PWM duty cycle output to a fan motor drive;
wherein said adjusting the present RPM comprises the fan motor drive controlling the at least one fan according to the PWM duty cycle output.

12. The method of claim 11, wherein said generating the PWM duty cycle output comprises changing the PWM duty cycle output at the present ramp rate.

13. The method of claim 1, further comprising shutting off the at least one fan in response to receiving a fan fault signal from the at least one fan.

14. The method of claim 1, wherein said specifying the plurality of RPM range values comprises setting the present value of the at least one of the plurality of RPM range values to a default value.

15. The method of claim 14,
wherein said adjusting the present value of the at least one of the plurality of RPM range values comprises setting the present value of the at least one of the plurality of RPM range values to the default value when the difference between the desired RPM and the present RPM is greater than the present value of the at least one of the plurality of RPM range values.

16. The method of claim 15, wherein said setting the present value of the at least one of the plurality of RPM range values to the default value when the difference between the desired RPM and the present RPM is greater than the present value of the at least one of the plurality of RPM range values comprises setting the present value of the at least one of the plurality of RPM range values to the default value only when the present value of the at least one of the plurality of RPM range values is greater than the default value.

17. The method of claim 14, wherein said adjusting the present value of the at least one of the plurality of RPM range values in response to said determining comprises leaving the present value of the at least one of the plurality of RPM range values unchanged when:
the present value of the at least one of the plurality of RPM range values is the default value;
and the difference between the desired RPM and the present RPM is greater than the default value.

18. The method of claim 1, wherein said adjusting the present value of at least one of the plurality of RPM range values in response to said determining comprises adjusting a present value of a smallest one of the plurality of RPM range values.

19. The method of claim 18, wherein said adjusting the present value of the smallest one of the plurality of RPM range values comprises increasing the present value of the smallest one of the plurality of RPM range values when the difference between the desired RPM and the present RPM is less than or equal to the present value of the smallest one of the plurality of RPM range values.

20. A system for controlling at least one fan, the system comprising:
a comparator configured to receive an indicator signal representative of a present RPM of the at least one fan and a reference signal representative of a desired RPM of the at least one fan, and operable to generate a difference signal comprising the indicator signal subtracted from the reference signal;
a control unit configured to select a present ramp rate from a plurality of ramp rates, wherein each one of the plurality of ramp rates corresponds to a different respective one of a plurality of RPM range values, wherein the present ramp rate corresponds to a largest one of the plurality of RPM range values that is less than an absolute value of the difference signal;
wherein the control unit is further configured to receive the difference signal, and operable to adjust the present RPM according to the difference signal at the present rate; and
wherein the control unit is further configured to adjust a present value of a smallest one of the plurality of RPM range values when the absolute value of the difference signal is less than or equal to the present value of the smallest one of the plurality of RPM range values.

21. The system of claim 20, wherein the control unit comprises:
a controller operable to generate one or more control signals based on the difference signal; and
a fan motor drive configured to receive the one or more control signals, and operable to change the present RPM according to the one or more control signals.

22. The system of claim 21, wherein the one or more control signals comprise:
a ramp control output; and
a ramp rate output corresponding to the present ramp rate;
wherein the fan motor drive is operable to change the present RPM according to the ramp control output at a rate corresponding to the ramp rate output.

23. The system of claim 21, wherein the one or more control signals comprise a PWM duty cycle output, wherein the controller is operable to change the PWM duty cycle output at a rate corresponding to the present ramp rate;
wherein the fan motor drive is operable to change the present RPM according to the PWM duty cycle output.

24. The system of claim 21, further comprising a tachometer detection circuit configured to receive a tachometer signal from the at least one fan, and operable to generate the indicator signal.

25. The system of claim 21, wherein the fan motor drive is further configured to receive a fan fault signal from the at least one fan, and is operable to shut down the at least one fan in response to the fan fault signal.

26. A method for controlling the RPM of at least one fan, the method comprising:

specifying a plurality of RPM range values, wherein each successive one of the plurality of RPM range values is larger than a preceding one of the plurality of RPM range values;

specifying a plurality of ramp rates, wherein each one of the plurality of ramp rates corresponds to a different respective one of the plurality of RPM range values, and wherein each successive one of the plurality of ramp rates is larger than a preceding one of the plurality of ramp rates, wherein a smallest one of the plurality of ramp rates corresponds to a smallest one of the plurality of RPM range values;

generating an error signal representative of a difference between a present RPM of the at least one fan and a desired RPM of the at least one fan;

selecting a present ramp rate from the plurality of ramp rates, wherein the present ramp rate corresponds to a largest one of the plurality of RPM range values that is less than an absolute value of the error signal;

adjusting the present RPM, wherein said adjusting comprises one of:

increasing the present RPM at the present ramp rate when the error signal is greater than zero; and decreasing the present RPM at the present ramp rate when the error signal is less than zero; and adjusting a present value of the smallest one of the plurality of RPM range values when the absolute value of the error signal is less than or equal to the present value of the smallest one of the plurality of RPM range values.

27. A system comprising:

at least one fan;

a circuit operable to generate a difference signal representative of a present RPM of the at least one fan subtracted from a desired RPM of the at least one fan;

a controller configured to couple to the at least one fan and to receive the difference signal, and operable to:

select a present ramp rate from a plurality of ramp rates, wherein each one of the plurality of ramp rates corresponds to a different respective one of a plurality of RPM range values, wherein each successive one of the plurality of RPM range values is larger than a preceding one of the plurality of RPM range values, wherein each successive one of the plurality of ramp rates is larger than a preceding one of the plurality of ramp rates, wherein a smallest one of the plurality of ramp rates corresponds to a smallest one of the plurality of RPM range values, and wherein the present ramp rate is corresponds to a largest one of the plurality of RPM range values that is less than an absolute value of the difference signal;

increase the present RPM at the present ramp rate if the difference signal is greater than zero;

decrease the present RPM at the present ramp rate if the error signal is less than zero; and adjust a present value of the smallest one of the plurality of RPM range values when the absolute value of the difference signal is less than or equal to the present value of the smallest one of the plurality of RPM range values.

28. A method for controlling at least one control parameter of a system, the method comprising:

comparing a present value of the at least one control parameter with a desired value of the at least one control parameter, to determine a difference between the desired value and the present value;

selecting a rate from a plurality of specified rates, wherein each of the plurality of specified rates corresponds to a different respective one of a plurality of non overlapping ranges of values corresponding to the at least one control parameter, wherein the selected rate corresponds to a respective range of the non overlapping ranges of values, wherein a value equivalent to an absolute value of the difference between the present value and the desired value falls within the respective range;

adjusting the present value at the selected rate and according to the difference between the present value and the desired value, to reach the desired value; and adjusting a present size of at least one of the plurality of non overlapping ranges of values according to the difference between the present value and the desired value.

29. The method of claim 28, wherein said adjusting the present value comprises:

increasing the present value at the selected rate if the difference is greater than zero; and decreasing the present value at the selected rate if the difference is less than zero.

30. The method of claim 28, further comprising setting the present size of the at least one of the plurality of non overlapping ranges of values to a default size prior to said adjusting the present size of the at least one of the plurality of non overlapping ranges of values.

31. The method of claim 28, wherein said adjusting the present size of the at least one of the plurality of non overlapping ranges of values comprises increasing the present size of the at least one of the plurality of non overlapping ranges of values by a specified amount.

* * * * *